Patented Jan. 24, 1950

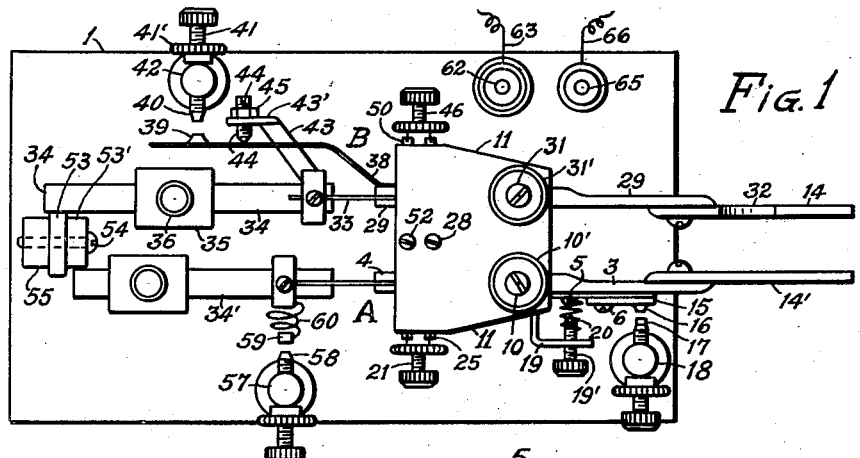

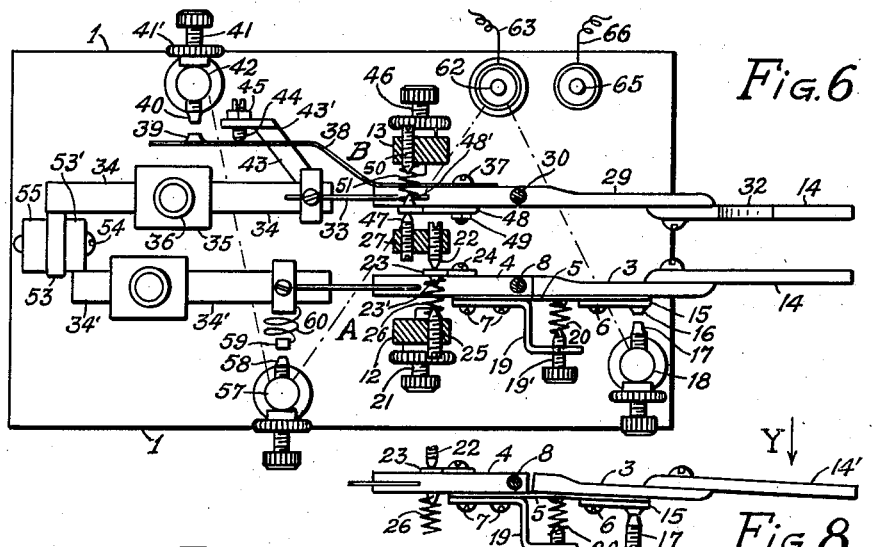
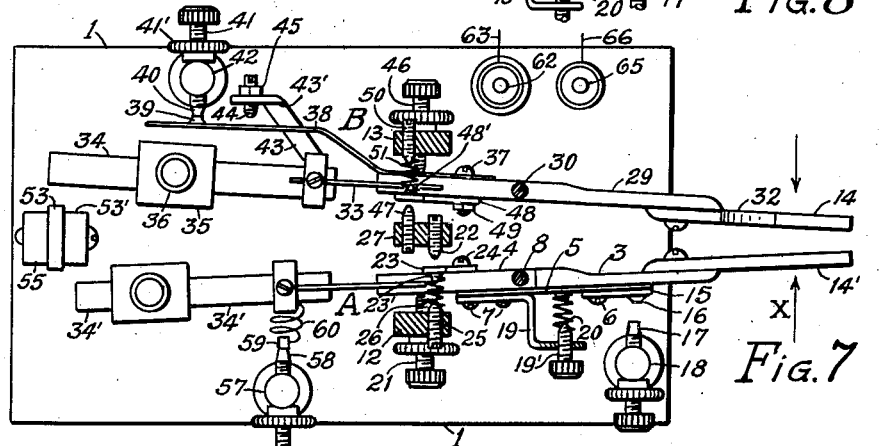
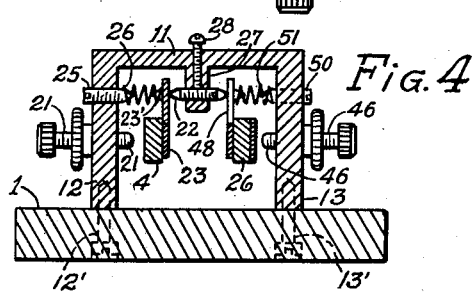
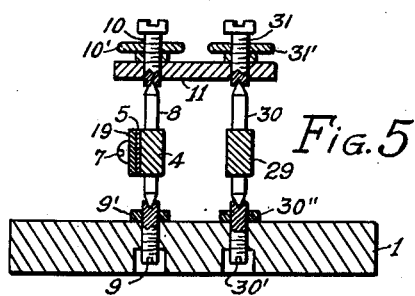

2,495,377

UNITED STATES PATENT OFFICE 2,495,377

DUPLEX TELEGRAPH SIGNAL AUTOMATIC MANIPULATOR

Tomas Tejera Mayorquin, Habana, Cuba

Application April 22, 1946, Serial No. 663,899
In Cuba March 25, 1946

3 Claims. (Cl. 178—82)

This invention relates to Duplex telegraph signal automatic manipulators, and it has for its object to provide certain improvements in the automatic manipulator of that kind which was the subject-matter of United States Patent No. 2,290,982, issued July 28th, 1942, to the present applicant, whereby the structure of the Morse dot manipulator as well as the structure of the Morse dash manipulator being the subject-matter of said United States Patent are rendered more simple and accurate.

An object of this invention is to simplify the structure of the known Morse dot manipulator, by limiting to a single straight lever the two associated levers forming the present Morse dot manipulator, and to convert this Morse dot manipulator in a Morse dot and Morse dash manipulator.

Another object of this invention is to simplify the structure of the Morse dash manipulator which was the subject-matter of said United States Patent No. 2,290,982, by limiting to a single lever the two associated levers forming said Morse dash automatic manipulator.

And a further object of the invention is to control in an accurate manner the position of the side stops for the levers operating the associated Morse dot manipulator and Morse dash automatic manipulator arranged on a common base, by means of micrometric screws adjustably mounted on a unitary and removable bridge disposed above both manipulators.

The invention is described with reference to the figures of the accompanying drawings in which like parts are indicated by the same reference numbers and letters, and of which:

Fig. 1 is a top plan view of the Duplex automatic vibrator manipulator for Morse dot and dash signals, constructed according to this invention.

Fig. 2 is an outer elevational side view of the improved Morse dot manipulator.

Fig. 3 is a bottom plan view of the base for the Duplex manipulator.

Fig. 4 is a cross-section vertical view on line 4—4 of Fig. 2.

Fig. 5 is a cross-section vertical view on line 5—5 of Fig. 2.

Fig. 6 is a horizontal section view on line 6—6 of Fig. 2, looking downward, showing both Morse dot and Morse dash automatic manipulators in their normal position.

Fig. 7 is a section view similar to that of Fig. 6, showing the Morse dot and Morse dash automatic manipulators in their vibrating position for dot and dash signals respectively.

And Fig. 8 is a detailed view of the single lever of the Morse dot manipulator in the vibrating position for one Morse dash signal.

This Duplex manipulator is composed of a metal base 1 supported on three stands made of electricity-insulating material 2, on which base there are adjacently disposed a Morse dot manipulator A of improved structure, and a dash automatic manipulator B of improved structure too.

The Morse dot manipulator A is composed of a lever divided into two straight portions 3 and 4 arranged with their respective adjacent inner and outer end faces normally in contact with one another, the portions 3 and 4 being resiliently connected together by means of an outer side spring strip 5 secured by screws 6 and 7 respectively to the lever portions 3 and 4.

The lever portion 4 is pivotally mounted on a vertical apex shaft 8 held between a lower screw 9 fixed to the base 1 and secured in adjustable position by a nut 9' and an upper screw 10 threadedly mounted through a threaded hole vertically formed in a bridge in the shape of a horizontal plate 11 and secured in adjustable position by a nut 10'. The bridge 11 is arranged transversally above both manipulators and is integral with two metal uprights 12 and 13 spaced apart on the base 1 and secured thereto by screws 12' and 13' from beneath it through respective holes in the base 1 and screwed in the uprights. The lever portion 3 has connected to its outer end a Bakelite vertical plate 14' and secured to the outer side of the connecting strip 5 that is juxtaposed to the lever portion 3 and by one of screws 6, is a vertical plate 15 carrying a movable contact 16 adapted to electrically contact the stationary contact 17 carried by the upright 18 secured to the base 1. The lever portion 4 has secured to the connecting spring strip 5 that is juxtaposed to said lever portion 4 and secured thereto by the screws 7 securing the strip 5 and the lever portion 4, a vertical plate 19 bent twice at a right angle, which has at its free end a threaded hole through which is threaded a horizontal screw 19' carrying on its inwardly projecting portion a coil spring 20 the free end of which rests against the outer side of the strip 5, so that in its normal position it will maintain both portions 3 and 4 in abutment and in straight alignment and actuate resiliently on the portion 3 to move it back to its normal position after withdrawn from it.

Since the Morse dot manipulator is well known, I will not explain in detail the remainder of its structure, but I will only add that the side movement of the portion 4 of the lever 3—4 is limited outwardly by a stop formed by a horizontal screw 21 threadedly mounted across the upright 12 and the position of the lever 3—4 is adjusted by the micrometric screw 22 that engages a plate 23 fixed by a screw 24 to the inner side of the lever portion 4 and carries a point 23' about which and about the inwardly projecting portion of a micrometric screw 25 mounted horizontally through a threaded hole formed in the upright 12, there is wound a coil spring 26, and the side movement of the same portion 4 of lever 3—4 is limited inwardly by the micrometric screw 22. This screw 22 is mounted horizontally through a threaded hole formed in a supporting arm 27 depending from the central portion of the bridge 11 and the adjustable position of which is fixed by a vertical set screw 28 which is screwed in a threaded hole formed vertically across the bridge 11 and the depending arm 27.

The dash automatic manipulator B is composed of a single metallic lever 29 pivotally mounted on a vertical apex shaft 30 held between a lower screw 30' fixed to the base 1 and fixable in adjusted position by a nut 30'' and an upper screw 31 threadedly mounted across a threaded hole vertically formed in the bridge 11 at a point in transversal alignment with the Morse dot manipulator vertical screw 19. The screw 31 is fixed in adjusted position by a nut 31'.

The lever 29 has at its outer end a Bakelite vertical plate 14 placed parallelly to the Bakelite vertical plate 14' of the Morse dot manipulator, the plate 14 having a curved cut 32 to allow the operator to operate both manipulators together with his right hand, as is known. The lever 29 has embedded at its inner end a vertical spring strip 33 which supports at its free end the vibratory horizontal bar 34 placed parallelly to the vibratory bar 34' of the Morse dot manipulator and being also provided with a weight 35 slidably adjusted by means to a set screw 36 to adjust the oscillation extent of the bar 34. The single lever 29 has secured to its outer side face by screws 37 a vertical spring strip 38 the free portion of which projects therefrom at a side of the bar 34 through an intermediate bent formed in the strip 38, and has at its end a movable contact 39 adapted to electrically contact the stationary contact 40 carried at the end of a horizontal screw 41 threadedly mounted on an electrically isolated upright 42 secured to the base 1, the adjusted position of the screw 41 being fixed by the nut 41', and from the inner end of the vibratory bar 34 projects laterally an onwardly projecting arm 43 which carries at its free end a raised portion 43' carrying a stop formed by a horizontal screw 44 threadedly mounted in a threaded hole formed in said raised portion 43' and the adjusted position of which is fixed by means of a nut 45. In the normal position the stop 44 rests against the outer side of the strip 38.

The lateral movement of the lever 29 is limited outwardly by a stop formed by the horizontal screw 46 threadedly mounted across the upright 13 and the position of the lever is regulated by a micrometric screw 47 which engages a plate 48 fixed by a screw 49 to the inner side of the lever 29 and carrying a point 48' about which and the inwardly projecting portion of a micrometric screw 50 horizontally mounted across a threaded hole formed in the upright 13, is wound a coil spring 51, and the lateral movement of the lever 29 is limited inwardly by the micrometric screw 47. This screw 47 is horizontally mounted across a threaded hole formed in the supporting arm 27 aforesaid, in a position parallelly to the micrometric screw 22 and at the same horizontal plane, the regulated position of the micrometric screw 47 being fixed by a vertical set screw 52 similar to vertical screw 28 similarly mounted.

The present improved structure of the Duplex manipulator embodies a single shock-absorber for both vibratory bars 34 and 34' of the Morse dash automatic manipulator B and the Morse dot manipulator A, the same consisting of two metal washers 53 and 53' of dissimilar diameter and carried at the end of a horizontal screw 54 secured to a metallic vertical upright 55 fixed by a screw 55' to the base 1. In the normal position the two vibratory bars 34 and 34' of dissimilar length rest respectively against the metallic washers 53 and 53'.

The insulated upright 42 is electrically connected beneath the base 1 by a wire 56 with the insulated upright 57 carrying the stationary contact 58 adapted to contact the movable contact 59 carried by the end of a coil spring 60 secured to the vibratory bar 34', and the insulated upright 57 is connected by a wire 61 to the insulated upright 62 forming one of the poles of the electric circuit and being connected with one of the conductors 63 of an electricity source line. The insulated upright 62 is connected by a wire 64 with the insulated upright 18 carrying the contact 17. The other pole of the electric circuit is formed by a screw 65 secured to the base 1 and connected with the other conductor 66 of the outer electrical line.

As represented in Fig. 2, each of the uprights carrying a stationary contact, for instance the upright 18, is supported on the base 1 by means of a screw 67 threaded thereto from beneath the base 1 and surrounded by a rubber sleeve 68 fitted across a vertical hole formed in the base 1, a rubber washer 69 being interposed between the upper face of the plate 1 and the lower face of the upright and another rubber washer 70 being interposed between the lower face of the base 1 and a metal washer 71 placed about the screw 67 adjacently the head thereof, both washers to be pressed by the screw head. Each isolated stand is also detachably mounted beneath the base 1 by a screw 72 the head of which remains within a lower cavity 73 formed in the isolated stand.

The mode of operation of both Morse dot manipulator and automatic manipulator for Morse dash signals is so well known that an explanation thereof is unnecessary so it is omitted herein. It will only be said with respect to the Morse dot manipulator, that by actuating the lever 3—4 thereof to the right in the direction indicated by the arrow X in Fig. 7, to form a series of Morse dot signals, both portions 3 and 4 of the lever will co-act in straight alignment as if they were integrally formed, in view of the abutment of the adjacent faces of both portions 3 and 4 of the lever. And upon the Bakelite plate 14' being pressed to the left in the direction indicated by the arrow Y in Fig. 8, to form one Morse dash signal, only the portion 3 of the same lever will oscillate to the left, the end adjacent faces of the portions 3 and 4 of the lever withdrawing from their normal contact, as is seen in Fig. 8, but both portions 3 and 4 will remain connected together by the spring strip 5 which will slightly bend itself, thereby causing the portion 3 to move back to its normal position as soon as the Bakelite plate 14' is released.

From the foregoing it will be seen that the structure of both the Morse dot manipulator and the Morse dash automatic manipulator is greatly improved and the operation of the vibratory levers is rendered more exact and accurate by means of the lateral stops adjustably by micrometric screws, the whole being formed by easily assembled parts.

It is obvious that slight changes can be made in the construction details of both manipulators, without thereby altering the essential character of the invention which is such as claimed hereinafter.

What I claim is:

1. A Morse dot and Morse dash manipulator having a lever divided into two portions normally in end abutting relation against each other, an outer lateral spring strip resiliently connecting together said portions of the lever, a movable contact on each portion of the lever, two stationary contacts to cooperate with the movable contacts on the two portions of the lever, said lever portions being adapted when moved to the right to coact as a unit with said stationary contacts to form a series of Morse dot signals and when moved to the left to only act the lever outermost portion to form a Morse dash signal.

2. A Morse dot and Morse dash manipulator comprising a supporting base, a lever divided into two portions normally in end abutting relation against each other, an outer lateral spring strip resiliently connecting together said portions of the lever, the lever portion situated innermost being pivotally mounted on a vertical apex shaft, supporting means on the base for the end points of said vertical shaft, stop adjustable means supported on the innermost portion of said lever and actuating resiliently on the outermost portion of the lever to maintain both portions in abutment, a movable contact on each portion of the lever, two stationary contacts on the supporting base to cooperate with the movable contacts on the two portions of the lever, said lever portions being adapted when moved to the right to coact as a unit with said stationary contacts to form a series of Morse dot signals and when moved to the left to only act the lever portion situated outermost to form a Morse dash signal.

3. A Morse dot and Morse dash manipulator comprising a supporting base, a lever divided into two portions normally in end abutting relation against each other, an outer lateral spring strip resiliently connecting together said portions of the lever, the lever portion situated innermost being pivotally mounted on a vertical apex shaft, supporting means on the base for the end points of said vertical shaft, stop adjustable means supported on the innermost portion of said lever and actuating resiliently on the outermost portion of the lever to maintain both portions in abutment, a spring strip carried at the free end of the innermost portion of the lever and projecting onwardly, a vibratory bar secured to the last spring strip, a movable contact carried on the vibratory bar, a movable contact carried on the outermost portion of the lever, two stationary contacts on the supporting base to cooperate with the movable contacts on the vibratory bar and on the outermost portion of the lever, said lever portions being adapted when moved to the right to coact with the vibratory bar as a unit with said stationary contacts to form a series of Morse dot signals and when moved to the left to only act the lever portion situated outermost to form a Morse dash signal.

TOMAS TEJERA MAYORQUIN.

REFERENCES CITED

The following references are of record in the file of this patent:

UNITED STATES PATENTS

| Number | Name | Date |
| --- | --- | --- |
| 2,290,982 | Mayorquin | July 28, 1942 |
| 2,329,531 | Hanson | Sept. 14, 1943 |